United States Patent Office 3,556,757
Patented Jan. 19, 1971

3,556,757
ALKALI METAL SALT BATH WITH ALKALI METAL ACETATE ADDITIVE FOR TREATMENT OF GLASSES AND GLASS-CERAMICS
Theodore R. Kozlowski, Horseheads, and Dennis A. Krygier, Corning, N.Y., assignors to Corning Glass Works, Corning, N.Y., a corporation of New York
No Drawing. Filed Feb. 5, 1968, Ser. No. 702,787
Int. Cl. C03c 21/00
U.S. Cl. 65—30                                              2 Claims

ABSTRACT OF THE DISCLOSURE

This invention relates to the strengthening of glass and glass-ceramic articles through an ion exchange reaction carried out in a bath of molten salt. More particularly, this invention relates to a method for decreasing the amount of molten inorganic alkali metal salt adhering to glass and glass-ceramic articles upon removal from the bath of molten salt by the addition of about 0.5–5% by weight of an alkali salt of acetic acid to a bath of the molten salt operating at about 300°–450° C.

---

A recent development in the fields of glass and glass-ceramic technology has been the discovery that the mechanical strengths of such articles can be improved as much as several fold through an ion exchange reaction whereby an integral surface compression layer is induced in the articles. In the area of glass, this ion exchange process comprises contacting an alkali silicate glass article at an elevated temperature, but below the strain point of the glass, with an external source of monovalent metal ions (generally, alkali metal ions) having an ionic radius greater than that of the alkali metal ions present in the glass article. This contact causes the replacement of the original alkali metal ions in a surface layer of the glass article with the larger monovalent metal ions. However, inasmuch as the exchange or replacement of ions is carried out at temperatures below the strain point of the glass, there is substantially no viscous flow therein and the larger ions are, therefore, apparently "crowded" into the sites within the surface layer previously occupied by the smaller original alkali metal ions. This crowding produces compressive stresses and effects the production of an integral surface compression layer in the article which is balanced by an interior tensile stress portion. British Pat. No. 917,388 describes such ion exchange reactions occurring through the thermal diffusion of ions and specifically discloses the strengthening of soda-lime-silica glass articles by means of the exchange of sodium ions in the glass surface with potassium ions.

French Patent No. 1,439,341 describes generally the strengthening of glass-ceramic articles through cation exchange in the crystal phase thereof, one specific example of such exchange involving glass-ceramic articles containing beta-spodumene solid solution as the predominant crystal phase wherein the lithium ions in the crystal are replaced with larger alkali metal ions, notably sodium ions, thereby creating an integral surface compression layer through the crowding in of the larger ion into the side within the crystal previously occupied by the lithium ion.

Various modifications in the ion exchange reaction have been disclosed in the prior art but a common denominator running throughout is the use of baths of molten inorganic salts as the preferred source of exchanging ions. Thus, the glass or glass-ceramic articles are commonly immersed in a bath of molten salt containing the ions which are to be exchanged with the ions in the glass or crystal structure of the original articles. It can be appreciated that upon removal of the glass or glass-ceramic articles from the salt baths, a certain amount of the molten salt will adhere thereto which must be removed therefrom before the article is placed in service. This adherence of the salt to the article is undesirable for three principal reasons: (1) the removed salt must be replaced in the bath with new salt added thereto, thereby creating an economic waste; (2) the time required to permit the molten salt to drip off the article is increased with the amount of molten salt adhering thereto; and (3) the time and effort required to wash off the salt from the article is increased with an increase in salt adsorbed thereon. Hence, for these purely economic reasons, it would be very desirable to reduce the amount of molten salt which is picked up by the glass and glass-ceramic articles upon removal from a molten salt bath.

We have discovered that the amount of molten salt containing lithium, sodium, and/or potassium ions which will adhere to glass and glass-ceramic articles upon removal from a bath of molten salt can be reduced by at least one-third and, in some instances, up to two-thirds by the addition to the bath of molten salt of about 0.5–5% sodium and/or potassium acetates at temperatures ranging about 300°–450° C.

Table I records several glass compositions, in weight percent, suitable for ion exchange strengthening which can serve to illustrate the operability of the instant invention. Examples 3, 4, and 5 are a borosilicate, a 96% silica glass, and a soda-lime-silica glass, respectively, which are included to demonstrate the essential universal applicability of our invention.

TABLE I

|  | 1 | 2 | 3 | 4 | 5 | 6 |
|---|---|---|---|---|---|---|
| $SiO_2$, percent | 61.41 | 65.2 | 80.27 | 96.5 | 73.2 | 63.9 |
| $Al_2O_3$, percent | 16.82 | 23.3 | 2.79 | 0.5 | 0.8 | 20.0 |
| $Na_2O$, percent | 12.70 | 0.3 | 3.97 |  | 17.0 | 0.4 |
| $K_2O$, percent | 3.64 | 0.2 | 0.4 |  | 0.4 | 0.2 |
| MgO, percent | 3.67 | 2.0 |  |  | 3.0 | 1.7 |
| CaO, percent | 0.24 | 0.1 | 0.8 |  | 5.2 | 0.1 |
| $TiO_2$, percent | 0.77 | 2.0 |  |  |  | 4.5 |
| $As_2O_3$, percent | 0.75 | 1.1 |  |  |  | 1.0 |
| $B_2O_3$, percent |  |  | 11.77 | 3.5 |  | 2.2 |
| $Li_2O$, percent |  | 3.8 |  |  |  | 3.6 |
| $Sb_2O_3$, percent |  |  |  |  | 0.4 |  |
| $ZrO_2$, percent |  | 2.0 |  |  |  |  |
| ZnO, percent |  |  |  |  |  | 2.4 |

Table II records several glass-ceramic compositions, in weight percent, which can be strengthened through an ion exchange reaction and which can illustrate the effectiveness of our invention in reducing the amount of molten salt that will adhere to such articles after immersion in a salt bath. As was pointed out with respect to the glass compositions reported in Table I, glass-ceramic compositions of widely-varying ingredients and proportions are also operable in our invention as is emphasized in Table II.

TABLE II

|  | 7 | 8 | 9 |
|---|---|---|---|
| $SiO_2$, percent | 71.0 | 64.0 | 63.88 |
| $Al_2O_3$, percent | 18.0 | 25.5 | 19.97 |
| MgO, percent | 3.0 | 3.8 | 1.67 |
| CaO, percent |  |  | 0.09 |
| $TiO_2$, percent | 4.25 |  | 4.54 |
| $As_2O_3$, percent |  |  | 1.00 |
| ZnO, percent | 1.0 |  | 2.54 |
| $Li_2O$, percent | 2.5 | 2.0 | 3.60 |
| $ZrO_2$, percent | 0.25 | 4.7 |  |
| $Na_2O$, percent |  |  | 0.36 |
| $B_2O_3$, percent |  |  | 2.19 |
| $K_2O$, percent |  |  | 0.16 |

Table III reports comparisons of salt pickup by the glass and glass-ceramic articles reported in Tables I and II utilizing baths of molten salts with and without the acetate additions of our invention. The data denote the amount of salt, in grams/cm.$^2$, adhering to pieces of cane about 4" x ¼" in diameter or bars 4" x ½" x ⅛" and, in the examples of acetate additions to the bath, the percentage decrease in the amount of salt adhering to the cane and bar samples. Each figure represents an average of five cane or bars. Examples 1–7 were cane samples while Examples 8 and 9 were bars.

TABLE III

| Example No. | Salt bath | Additive | Avg. amount of adhered salt | Percentage improvement |
|---|---|---|---|---|
| 1 | KNO₃ at 450° C | None | 0.0200 | |
| 1 | KNO₃ at 450° C | 3% KC₂H₃O₂ | 0.0184 | 8 |
| 1 | KNO₃ at 450° C | 3% NaC₂H₃O₂ | 0.0164 | 18 |
| 1 | NaNO₃ at 420° C | None | 0.0152 | |
| 1 | NaNO₃ at 420° C | 3% NaC₂H₃O₂ | 0.0150 | 1 |
| 1 | NaNO₃ at 420° C | 3% KC₂H₃O₂ | 0.0144 | 5 |
| 1 | NaNO₃ at 320° C | None | 0.0405 | |
| 1 | NaNO₃ at 320° C | 3% NaC₂H₃O₂ | 0.0214 | 47 |
| 2 | KNO₃ at 450° C | None | 0.0574 | |
| 2 | KNO₃ at 450° C | 0.5% KC₂H₃O₂ | 0.0253 | 55 |
| 2 | KNO₃ at 450° C | 3% KC₂H₃O₂ | 0.0212 | 63 |
| 2 | KNO₃ at 450° C | 3% NaC₂H₃O₂ | 0.0222 | 61 |
| 2 | NaNO₃ at 420° C | None | 0.0514 | |
| 2 | NaNO₃ at 420° C | 3% NaC₂H₃O₂ | 0.0184 | 41 |
| 2 | NaNO₃ at 420° C | 3% KC₂H₃O₂ | 0.0210 | 33 |
| 2 | NaNO₃ at 320° C | None | 0.0903 | |
| 2 | NaNO₃ at 320° C | 3% NaC₂H₃O₂ | 0.0349 | 61 |
| 3 | KNO₃ at 400° C | None | 0.0073 | |
| 3 | KNO₃ at 400° C | 1% KC₂H₃O₂ | 0.0035 | 52.1 |
| 3 | KNO₃ at 400° C | 3% KC₂H₃O₂ | 0.0025 | 65.8 |
| 3 | KNO₃ at 400° C | 1% NaC₂H₃O₂ | 0.0022 | 70.0 |
| 3 | KNO₃ at 350° C | None | 0.0045 | |
| 3 | KNO₃ at 350° C | 3% KC₂H₃O₂ | 0.0026 | 42.2 |
| 3 | KNO₃ at 350° C | 3% NaC₂H₃O₂ | 0.0020 | 55.6 |
| 3 | KNO₃ at 335° C | None | 0.0096 | |
| 3 | KNO₃ at 335° C | 1% KC₂H₃O₂ | 0.0071 | 26.0 |
| 3 | KNO₃ at 335° C | 3% KC₂H₃O₂ | 0.0074 | 22.9 |
| 3 | KNO₃ at 335° C | 3% NaC₂H₃O₂ | 0.0058 | 39.6 |
| 3 | NaNO₃ at 400° C | None | 0.0079 | |
| 3 | NaNO₃ at 400° C | 1% KC₂H₃O₂ | 0.0040 | 49.4 |
| 3 | NaNO₃ at 400° C | 3% KC₂H₃O₂ | 0.0058 | 26.6 |
| 3 | NaNO₃ at 400° C | 3% NaC₂H₃O₂ | 0.0050 | 36.7 |
| 3 | NaNO₃ at 350° C | None | 0.0066 | |
| 3 | NaNO₃ at 350° C | 3% KC₂H₃O₂ | 0.0056 | 15.2 |
| 3 | NaNO₃ at 350° C | 1% KC₂H₃O₂ | 0.0045 | 31.8 |
| 3 | NaNO₃ at 350° C | 3% NaC₂H₃O₂ | 0.0056 | 15.2 |
| 3 | NaNO₃ at 330° C | None | 0.0047 | |
| 3 | NaNO₃ at 330° C | 3% NaC₂H₃O₂ | 0.0041 | 12.8 |
| 4 | KNO₃ at 450° C | None | 0.0210 | |
| 4 | KNO₃ at 450° C | 3% KC₂H₃O₂ | 0.0137 | 35 |
| 4 | KNO₃ at 450° C | 3% NaC₂H₃O₂ | 0.0136 | 35 |
| 4 | NaNO₃ at 420° C | None | 0.0217 | |
| 4 | NaNO₃ at 420° C | 3% NaC₂H₃O₂ | 0.0089 | 59 |
| 4 | NaNO₃ at 420° C | 3% KC₂H₃O₂ | 0.0111 | 49 |
| 4 | NaNO₃ at 320° C | None | 0.0508 | |
| 4 | NaNO₃ at 320° C | 3% NaC₂H₃O₂ | 0.0237 | 47 |
| 5 | KNO₃ at 400° C | None | 0.0027 | |
| 5 | KNO₃ at 400° C | 3% KC₂H₃O₂ | 0.0019 | 48.6 |
| 5 | KNO₃ at 350° C | None | 0.0019 | |
| 5 | KNO₃ at 350° C | 1% KC₂H₃O₂ | 0.0016 | 15.8 |
| 5 | KNO₃ at 350° C | 3% KC₂H₃O₂ | 0.0012 | 36.8 |
| 5 | KNO₃ at 335° C | None | 0.0028 | |
| 5 | KNO₃ at 335° C | 1% KC₂H₃O₂ | 0.0026 | 7.1 |
| 5 | NaNO₃ at 400° C | None | 0.0031 | |
| 5 | NaNO₃ at 400° C | 3% KC₂H₃O₂ | 0.0019 | 38.7 |
| 5 | NaNO₃ at 400° C | 1% NaC₂H₃O₂ | 0.0019 | 38.7 |
| 5 | NaNO₃ at 400° C | 3% NaC₂H₃O₂ | 0.0018 | 41.9 |
| 5 | NaNO₃ at 350° C | None | 0.0044 | |
| 5 | NaNO₃ at 350° V | 1% KC₂H₃O₂ | 0.0035 | 20.5 |
| 5 | NaNO₃ at 350° C | 3% KC₂H₃O₂ | 0.0027 | 38.6 |
| 5 | NaNO₃ at 350° C | 1% NaC₂H₃O₂ | 0.0039 | 11.4 |
| 5 | NaNO₃ at 350° C | 3% NaC₂H₃O₂ | 0.0034 | 22.7 |
| 5 | NaNO₃ at 330° C | None | 0.0040 | |
| 5 | NaNO₃ at 330° C | 3% KC₂H₃O₂ | 0.0037 | 7.5 |
| 5 | NaNO₃ at 330° C | 1% NaC₂H₃O₂ | 0.0028 | 3.0 |
| 6 | KNO₃ at 400° C | None | 0.0074 | |
| 6 | KNO₃ at 400° C | 1% KC₂H₃O₂ | 0.0039 | 47.3 |
| 6 | KNO₃ at 400° C | 3% KC₂H₃O₂ | 0.0052 | 29.7 |
| 6 | KNO₃ at 400° C | 1% NaC₂H₃O₂ | 0.0034 | 54.1 |
| 6 | KNO₃ at 400° C | 3% NaC₂H₃O₂ | 0.0060 | 18.9 |
| 6 | KNO₃ at 350° C | None | 0.0054 | |
| 6 | KNO₃ at 350° C | 3% KC₂H₃O₂ | 0.0046 | 14.8 |
| 6 | KNO₃ at 350° C | 1% NaC₂H₃O₂ | 0.0037 | 31.5 |
| 6 | KNO₃ at 350° C | None | 0.0114 | |
| 6 | KNO₃ at 335° C | 1% KC₂H₃O₂ | 0.0075 | 34.2 |
| 6 | KNO₃ at 335° C | 3% KC₂H₃O₂ | 0.0054 | 52.6 |
| 6 | KNO₃ at 335° C | 3% NaC₂H₃O₂ | 0.0060 | 47.4 |
| 6 | NaNO₃ at 400° C | None | 0.0113 | |
| 6 | NaNO₃ at 400° C | 1% KC₂H₃O₂ | 0.0043 | 61.9 |
| 6 | NaNO₃ at 400° C | 3% KC₂H₃O₂ | 0.0043 | 61.9 |
| 6 | NaNO₃ at 400° C | 1% NaC₂H₃O₂ | 0.0047 | 54.4 |
| 6 | NaNO₃ at 400° C | 3% NaC₂H₃O₂ | 0.0066 | 41.6 |
| 6 | NaNO₃ at 350° C | None | 0.0083 | |
| 6 | NaNO₃ at 350° C | 1% NaC₂H₃O₂ | 0.0048 | 42.2 |
| 6 | NaNO₃ at 350° C | 3% NaC₂H₃O₂ | 0.0079 | 4.8 |
| 6 | NaNO₃ at 330° C | None | 0.0080 | |
| 6 | NaNO₃ at 330° C | 1% NaC₂H₃O₂ | 0.0078 | 2.5 |
| 6 | NaNO₃ at 330° C | 3% NaC₂H₃O₂ | 0.0070 | 12.5 |
| 7 | KNO₃ at 400° C | None | 0.0079 | |
| 7 | KNO₃ at 400° C | 1% KC₂H₃O₂ | 0.0032 | 59.5 |
| 7 | KNO₃ at 400° C | 3% KC₃H₃O₂ | 0.0030 | 62.0 |
| 7 | KNO₃ at 400° C | 1% NaC₂H₃O₂ | 0.0022 | 72.2 |
| 7 | KNO₃ at 400° C | 3% NaC₂H₃O₂ | 0.0026 | 67.1 |
| 7 | KNO₃ at 350° C | None | 0.0060 | |
| 7 | KNO₃ at 350° C | 1% KC₂H₃O₂ | 0.0019 | 68.3 |
| 7 | KNO₃ at 350° C | 3% KC₂H₃O₂ | 0.0024 | 60.0 |
| 7 | KNO₃ at 350° C | 3% NaC₂H₃O₂ | 0.0049 | 18.3 |
| 7 | KNO₃ at 335° C | None | 0.0135 | |
| 7 | KNO₃ at 335° C | 1% KC₃₂H₃O₂ | 0.0092 | 31.8 |
| 7 | KNO₃ at 335° C | 3% KC₂H₃O₂ | 0.0124 | 8.1 |
| 7 | KNO₃ at 335° C | 3% NaC₂H₃O₂ | 0.0080 | 40.7 |
| 7 | NaNO₃ at 400° C | None | 0.0088 | |
| 7 | NaNO₃ at 400° C | 1% KC₂H₃O₂ | 0.0032 | 63.6 |
| 7 | NaNO₃ at 400° C | 3% KC₂H₃O₂ | 0.0054 | 38.6 |
| 7 | NaNO₃ at 400° C | 1% NaC₂H₃O₂ | 0.0025 | 71.6 |
| 7 | NaNO₃ at 400° C | 3% NaC₂H₃O₂ | 0.0080 | ,9.1 |
| 7 | NaNO₃ at 350° C | None | 0.0080 | |
| 7 | NaNO₃ at 350° C | 3% KC₂H₃O₂ | 0.0053 | 33.8 |
| 7 | NaNO₃ at 350° C | 1% NaC₂H₃O₂ | 0.0046 | 42.5 |
| 7 | NaNO₃ at 330° C | None | 0.0076 | |
| 7 | NaNO₃ at 330° C | 1% KC₃H₃O₂ | 0.0055 | 27.6 |
| 7 | NaNO₃ at 330° C | 1% NaC₂H₃O₂ | 0.0054 | 28.9 |
| 8 | KNO₃ at 400° C | None | 0.0078 | |
| 8 | KNO₃ at 400° C | 1% KC₂H₃O₂ | 0.0057 | 26.9 |
| 8 | KNO₃ to 400° C | 3% KC₂H₃O₂ | 0.0064 | 17.9 |
| 8 | KNO₃ at 400° C | 1% NaC₂H₃O₂ | 0.0072 | 7.7 |
| 8 | KNO₃ at 350° C | None | 0.0059 | |
| 8 | KNO₃ at 350° C | 1% KC₂H₃O₂ | 0.0051 | 13.6 |
| 8 | KNO₃ at 350° C | 3% KC₂H₃O₂ | 0.0044 | 25.4 |
| 8 | KNO₃ at 335° C | None | 0.0910 | |
| 8 | KNO₃ at 335° C | 1% KC₂H₃O₂ | 0.0176 | 80.7 |
| 8 | KNO₃ at 335° C | 3% KC₂H₃O₂ | 0.0156 | 82.8 |
| 8 | KNO₃ at 335° C | 1% NaC₂H₃O₂ | 0.0690 | 24.2 |
| 8 | KNO₃ at 335°C | 3% NaC₂H₃O₂ | 0.0248 | 72.7 |
| 8 | NaNO₃ at 400° C | None | 0.0137 | |
| 8 | NaNO₃ at 400° C | 1% KC₂H₃O₂ | 0.0046 | 66.4 |
| 8 | NaNO₃ at 400° C | 3% KC₂H₃O₂ | 0.0092 | 32.8 |
| 8 | NaNO₃ at 400° C | 1% NaC₂H₃O₂ | 0.0053 | 61.3 |
| 8 | NaNO₃ at 400° C | 3% NaC₂H₃O₂ | 0.0074 | 46.0 |
| 8 | NaNO₃ at 350° C | None | 0.0114 | |
| 8 | NaNO₃ at 350° C | 1% KC₂H₃O₂ | 0.0090 | 21.0 |
| 8 | NaNO₃ at 350° C | 3% KC₂H₃O₂ | 0.0091 | 20.2 |
| 8 | NaNO₃ at 350° C | 1% NaC₂H₃O₂ | 0.0072 | 36.8 |
| 8 | NaNO₃ at 350° C | 3% NaC₂H₃O₂ | 0.0062 | 45.6 |
| 9 | KNO₃ at 400° C | None | 0.0106 | |
| 9 | KNO₃ at 400° C | 1% KC₂H₃O₂ | 0.0030 | 71.4 |
| 9 | KNO₃ at 400° C | 3% NaC₂H₃O₂ | 0.0104 | 1.9 |
| 9 | KNO₃ at 350° C | None | 0.0090 | |
| 9 | KNO₃ at 350° C | 1% KC₂H₃O₂ | 0.0062 | 31.1 |
| 9 | KNO₃ at 350° C | 3% KC₂H₃O₂ | 0.0046 | 48.9 |
| 9 | KNO₃ at 350° C | 1% NaC₂H₃O₂ | 0.0084 | 6.7 |
| 9 | KNO₃ at 350° C | 3% NaC₂H₃O₂ | 0.0021 | 76.7 |
| 9 | NaNO₃ at 400° C | None | 0.0070 | |
| 9 | NaNO₃ at 400° C | 1% KC₂H₃O₂ | 0.0030 | 57.1 |
| 9 | NaNO₃ at 330° C | None | 0.0094 | |
| 9 | NaNO₃ at 330° C | 1% KC₂H₃O₂ | 0.0068 | 27.6 |
| 9 | NaNO₃ at 330° C | 3% KC₂H₃O₂ | 0.0093 | 1.1 |
| 9 | NaNO₃ at 330° C | 3% NaC₂H₃O₂ | 0.0070 | 25.5 |

Table III, when read in conjunction with Tables I and II, clearly indicates the effectiveness of the additions of alkali acetates to various baths of molten alkali metal salts in reducing the amount of molten salt which will adhere to glass and glass-ceramic articles upon their removal from the bath. Although amounts of these additions up to about 5% by weight are useful, concentrations about 1–3% by weight are preferred. Above about 5% by weight, rapid evolution of gases creates a serious hazard. Likewise, at temperatures above about 450° C., rapid reaction of the organic constituent with the molten salt creates a serious hazard. Thus, where ion exchange reactions higher than about 450° C. are required, a final immersion of only a few minutes duration in a salt bath containing alkali acetates below 450° C. at the end of a production tank would greatly reduce the amount of salt clinging to the article. Decreased washing times and reduced pollution of drainage (less salt to be washed off) would be two advantages gained thereby.

We claim:

1. A method for reducing the amount of inorganic alkali metal salt adhering to glass and glass-ceramic articles upon the removal of such articles from a bath consisting essentially of a molten inorganic salt of an alkali metal, said alkali metal being selected from the group consisting of lithium, sodium, and potassium, which comprises adding about 0.5–5% by weight total of at least one compound selected from the group consisting of sodium acetate and potassium acetate to said bath of molten salt operating at about 300°–450° C.

2. A method according to claim 1 wherein the total of at least one compound selected from the group consisting of sodium acetate and potassium acetate is about 1–3% by weight.

References Cited

UNITED STATES PATENTS 3,481,726 12/1969 Fischer et al. ......... 65—30

FOREIGN PATENTS 917,388 2/1963 Great Britain.

S. LEON BASHORE, Primary Examiner

R. L. LINDSAY, JR., Assistant Examiner

U.S. Cl. X.R.

65—114; 134—2